(12) United States Patent
Loh et al.

(10) Patent No.: US 8,984,368 B2
(45) Date of Patent: Mar. 17, 2015

(54) HIGH RELIABILITY MEMORY CONTROLLER

(71) Applicant: Advanced Micro Devices, Inc., Sunnyvale, CA (US)

(72) Inventors: Gabriel H. Loh, Bellevue, WA (US); Vilas K. Sridharan, Brookline, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 122 days.

(21) Appl. No.: 13/649,745

(22) Filed: Oct. 11, 2012

(65) Prior Publication Data

US 2014/0108885 A1    Apr. 17, 2014

(51) Int. Cl.
G11C 29/00 (2006.01)
G06F 11/10 (2006.01)

(52) U.S. Cl.
CPC .................................. G06F 11/1044 (2013.01)
USPC ............................................. 714/763; 714/785

(58) Field of Classification Search
CPC ............ G06F 11/1044; G06F 11/1048; G06F 11/1012; G06F 11/1068; G06F 11/1028
USPC .................................................. 714/763, 785
See application file for complete search history.

(56) References Cited

U.S. PATENT DOCUMENTS

| 5,329,489 | A | 7/1994 | Diefendorff |
| 5,412,787 | A | 5/1995 | Forsyth et al. |
| 5,764,946 | A | 6/1998 | Tran et al. |
| 5,784,391 | A | 7/1998 | Konigsburg |
| 5,802,594 | A | 9/1998 | Wong et al. |
| 5,845,323 | A | 12/1998 | Roberts et al. |
| 5,846,323 | A | 12/1998 | Egami et al. |
| 5,848,433 | A | 12/1998 | Tran et al. |
| 5,974,506 | A | 10/1999 | Sicola et al. |
| 6,016,533 | A | 1/2000 | Tran |
| 6,038,693 | A | 3/2000 | Zhang |
| 6,044,478 | A | 3/2000 | Green |

(Continued)

FOREIGN PATENT DOCUMENTS

| EP | 1513062 | 3/2005 |
| EP | 1612683 | 1/2006 |

(Continued)

OTHER PUBLICATIONS

Stuart Schechter, Gabriel H. Loh, Karin Strauss, and Doug Burger; "Use ECP, not ECC, for Hard Failures in Resistive Memories," Proceedings of the 37th Annual International Symposium on Computer Architecture; pp. 141 to 152; vol. 38, Issue 3, Jun. 2010, ACM 978-1-4503-0053-7/10/06; The Association for Computing Machinery, 2 Penn Plaza, Suite 701, New York, New York 10121-0701.

(Continued)

*Primary Examiner* — Sam Rizk
(74) *Attorney, Agent, or Firm* — Polansky & Associates, P.L.L.C.; Paul J. Polansky

(57) ABSTRACT

An integrated circuit includes a memory having an address space and a memory controller coupled to the memory for accessing the address space in response to received memory accesses. The memory controller further accesses a plurality of data elements in a first portion of the address space, and reliability data corresponding to the plurality of data elements in a second portion of the address space.

11 Claims, 7 Drawing Sheets

(56) References Cited

U.S. PATENT DOCUMENTS

| | | |
|---|---|---|
| 6,061,759 A | 5/2000 | Guo |
| 6,073,230 A | 6/2000 | Pickell et al. |
| 6,138,213 A | 10/2000 | McMinn |
| 6,223,322 B1* | 4/2001 | Michigami et al. ............ 714/769 |
| 6,256,762 B1* | 7/2001 | Beppu ............................ 714/763 |
| 6,282,644 B1 | 8/2001 | Ko |
| 6,314,514 B1 | 11/2001 | McDonald |
| 6,353,910 B1* | 3/2002 | Carnevale et al. ............ 714/763 |
| 6,493,800 B1 | 12/2002 | Blumrich |
| 6,629,207 B1 | 9/2003 | Yoshioka et al. |
| 6,804,162 B1 | 10/2004 | Eldridge et al. |
| 7,007,210 B2 | 2/2006 | Fields et al. |
| 7,117,290 B2 | 10/2006 | Shen et al. |
| 7,620,875 B1 | 11/2009 | Nelson et al. |
| 7,673,216 B2 | 3/2010 | Hino et al. |
| 7,707,463 B2 | 4/2010 | Bartley et al. |
| 7,809,980 B2 | 10/2010 | Refaeli et al. |
| 2001/0034808 A1 | 10/2001 | Nakajima et al. |
| 2003/0065886 A1 | 4/2003 | Olarig et al. |
| 2003/0200395 A1 | 10/2003 | Wicki et al. |
| 2004/0024958 A1 | 2/2004 | Bains et al. |
| 2005/0050278 A1 | 3/2005 | Meier et al. |
| 2005/0228631 A1 | 10/2005 | Maly et al. |
| 2006/0143390 A1 | 6/2006 | Kollapalli |
| 2007/0079217 A1* | 4/2007 | Haugan et al. ................ 714/763 |
| 2007/0220247 A1 | 9/2007 | Lee et al. |
| 2008/0072120 A1* | 3/2008 | Radke ............................ 714/768 |
| 2008/0235485 A1 | 9/2008 | Haertel et al. |
| 2009/0172449 A1 | 7/2009 | Zhang et al. |
| 2009/0276587 A1 | 11/2009 | Moyer et al. |
| 2010/0251036 A1 | 9/2010 | Moyer |
| 2012/0182821 A1* | 7/2012 | Perego ..................... 365/230.03 |

FOREIGN PATENT DOCUMENTS

| | | |
|---|---|---|
| EP | 1862906 | 12/2007 |
| WO | 02091382 | 11/2002 |
| WO | 2008115400 | 9/2008 |

OTHER PUBLICATIONS

Loh et al, "Efficiently Enabling Conventional Block Sizes for Very Large Die-Stacked DRAM Caches," Proceedings 44th Annual IEEE/ACM International Symposium on Microarchitecture, Dec. 3-7, 2011, pp. 454-464.

International Search Report and Written Opinion International Application No. PCT/US2013/063881, mailed Jan. 8, 2014, 7 pages.

Actions on the Merits for Copending U.S. Appl. No. 13/532,125, filed Jun. 25, 2012.

International Search Report and Written Opinion International Application No. PCT/US2012/066217 mailed Mar. 13, 2013; pp. 1-12.

International Search Report and Written Opinion Application No. PCT/US2010/028892 mailed Jul. 6, 2010.

Powell MD. et al:"Reducing Set-Associative Cache Energy via Way-Prediction and Selective Direct-Mapping" Micro-34, Proceedings of the 34th International Symposium on Microarchitecture, Dec. 1-5, 2001, Piscataway, NJ USA., 12 pages.

* cited by examiner

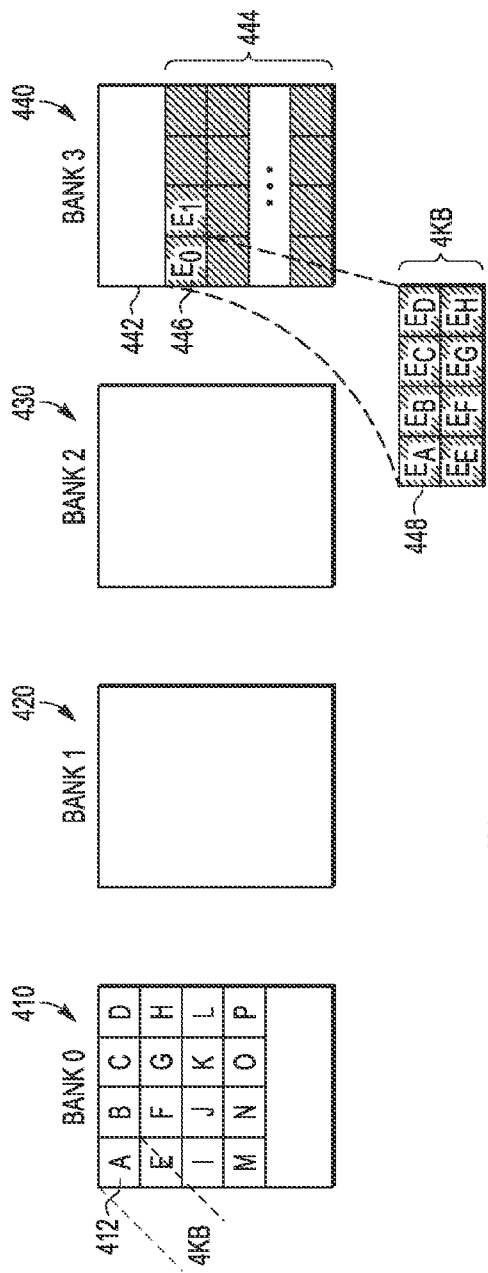
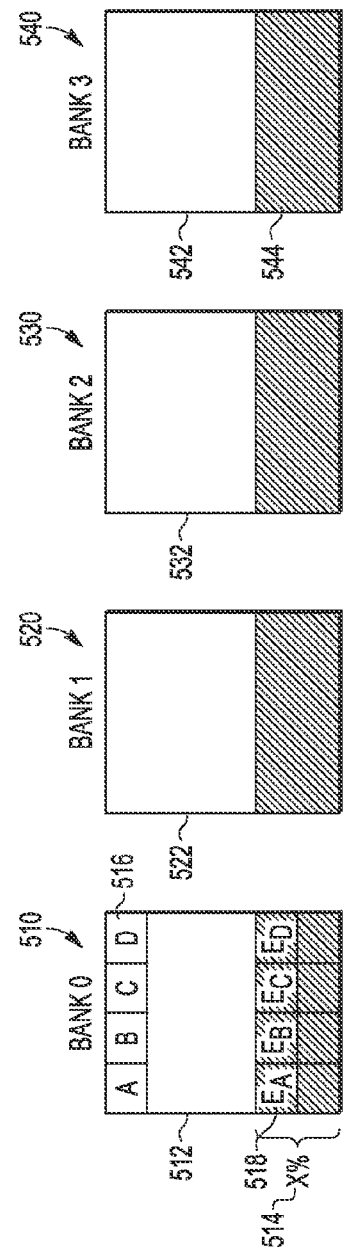
FIG. 4
FIG. 5

HIGH RELIABILITY MEMORY CONTROLLER

Related subject matter is found in a copending patent application entitled "A DRAM Cache With Tags and Data Jointly Stored In Physical Rows", U.S. patent application Ser. No. 13/307,776, filed Nov. 30, 2011, by Gabriel H. Loh et al.; and in a copending patent application entitled "Integrated Circuit With High Reliability Cache Controller and Method Therefor", U.S. patent application Ser. No. 13/532,125, filed Jun. 25, 2012, by Gabriel H. Loh et al.

FIELD

This disclosure relates generally to integrated circuits, and more specifically to integrated circuits having memory controllers.

BACKGROUND

Consumers continue to demand computer systems with higher performance and lower cost. To address higher performance requirements, computer chip designers have developed integrated circuits with multiple processor cores on a single chip. In addition, various die stacked integration technologies have been developed that package the multi-core integrated microprocessor and associated memory chips as a single component. However memory chips are susceptible to various fault conditions. In the case of memory chips used in stacked die configurations, when a permanent fault occurs, it is not possible to easily replace the memory chip without replacing all other chips in the stack.

BRIEF DESCRIPTION OF THE DRAWINGS

FIG. 4 illustrates a representation of an address space for the memory of FIG. 3 according to some embodiments.

FIG. 5 illustrates another representation of an address space for the memory of FIG. 3 according to some embodiments.

Figure 1:
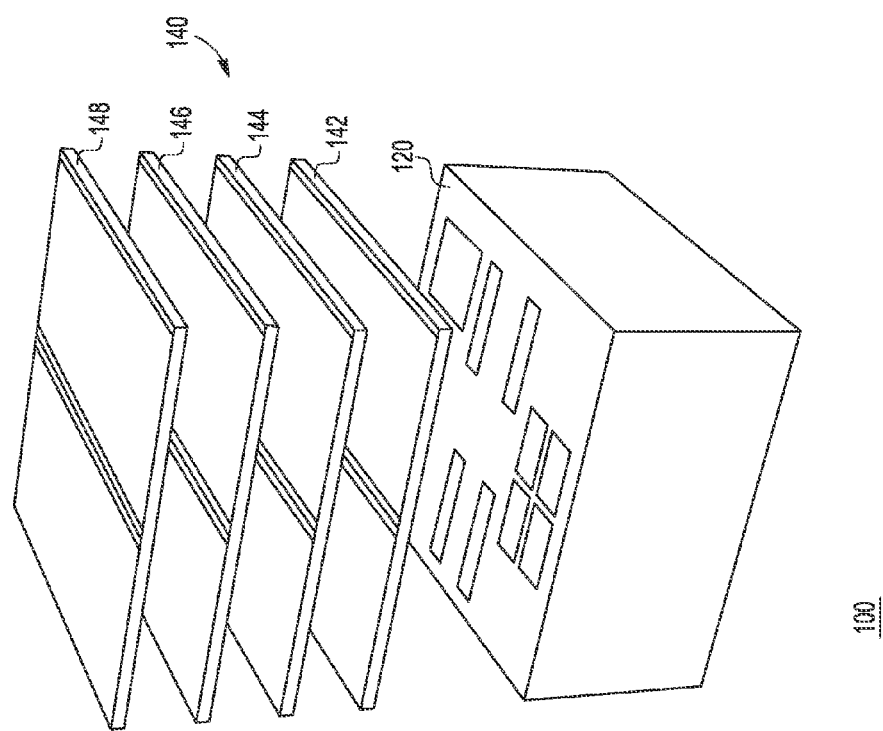
FIG. 1 illustrates a perspective view of a first multi-chip module implementing physical memory according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

FIG. 1 illustrates a perspective view of a first multi-chip module implementing physical memory according to some embodiments. Multi-chip module 100 generally includes a multi-core processor chip 120 and a memory chip stack 140. Memory chip stack 140 includes a plurality of memory chips stacked on top of each other. As illustrated in FIG. 1, memory chip stack 140 includes a memory chip 142, a memory chip 144, a memory chip 146, and a memory chip 148. Note that, in general, memory chip stack 140 may include more or fewer memory chips than illustrated in FIG. 1. Each individual memory chip of memory chip stack 140 is connected to other memory chips of memory chip stack 140, as desired for proper system operation. Each individual memory chip of memory chip stack 140 also connects to multi-core chip 120, as desired, for proper system operation.

In operation, the components of multi-chip module 100 are combined in a single integrated circuit package, where memory chip stack 140 and multi-core chip 120 appear to the user as a single integrated circuit. Electrical connection of memory chip stack 140 to multi-core chip 120 is accomplished using vertical interconnect, for example, a via or silicon through hole, in combination with horizontal interconnect. Multi-core processor die 120 is thicker than memory chips in memory chip stack 140 and physically supports memory chip stack 140. When compared to five individual chips, multi-chip module 100 saves system cost and board space, while decreasing component access time and increasing system performance in general. However the memory chips are subject to various reliability issues. For example, background radiation, such as alpha particles occurring naturally in the environment or emitted from semiconductor packaging material can strike a bit cell, causing the value to be corrupted. Repeated use of the memory can also lead to other failures. For example, electromigration in certain important devices could lead those devices to wear out: they effectively become thinner, thereby increasing their resistance and eventually leading to timing errors that cause incorrect values to be read. Other types of faults are also possible. If a memory chip fails, there's no practical way to replace the failing memory chip. Instead, the user must replace the entire package, including all of the still working memory and processor chips, which is an expensive option.

Figure 2:
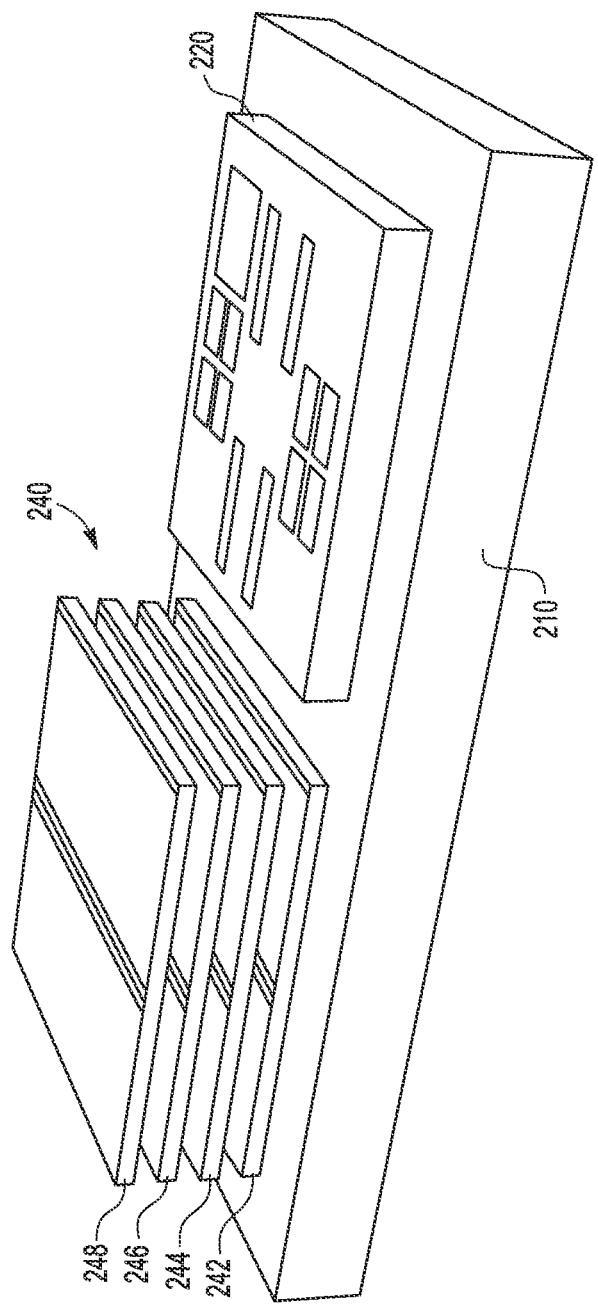
FIG. 2 illustrates a perspective view of a second multi-chip module implementing physical memory according to some embodiments.

FIG. 2 illustrates a perspective view of a second multi-chip module 200 implementing physical memory according to some embodiments. Multi-chip module 200 generally includes an interposer 210, a multi-core processor chip 220, and a memory chip stack 240. Interposer 210 is connected to the active side of multi-core chip 220. Memory chip stack 240 includes a plurality of memory chips stacked on top of each other. As illustrated in FIG. 2, memory chip stack 240 includes memory chip 242, memory chip 244, memory chip 246, and memory chip 248. Note that, in general, memory chip stack 240 may include more or fewer memory chips than illustrated in FIG. 2. Each individual memory chip of memory chip stack 240 is connected to other memory chips of memory chip stack 240, as desired for proper system operation. Each individual memory chip of memory chip stack 240 is also connected to multi-core chip 220, as desired for proper system operation. In some embodiments, memory chip stack 240 includes a single memory chip. In some embodiments, the multi-chip module 200 includes more than one memory chip stack like memory chip stack 240.

In operation, the components of multi-chip module 200 are combined in a single package (not shown in FIG. 2), and thus memory chip stack 240 and multi-core chip 220 appear to the user as a single integrated circuit. Electrical connection of memory chip stack 240 to multi-core chip 220 is accomplished using vertical interconnect, for example, a via or silicon through hole, in combination with horizontal interconnect. Interposer 210 provides both a physical support and an interface to facilitate connecting each individual memory chip of memory chip stack 240 multi-core chip 220. When compared to five individual chips, multi-chip module 200 saves system cost and board space, while decreasing component access time and increasing system performance in general. Multi-chip module 200 separates memory chip stack 240 from multi-core processor 220 and so allows better cooling of multi-core processor 220. However, multi-chip module 200 also suffers from reliability and serviceability issues since a defective memory chip cannot be easily replaced without replacing the entire package.

Figure 3:
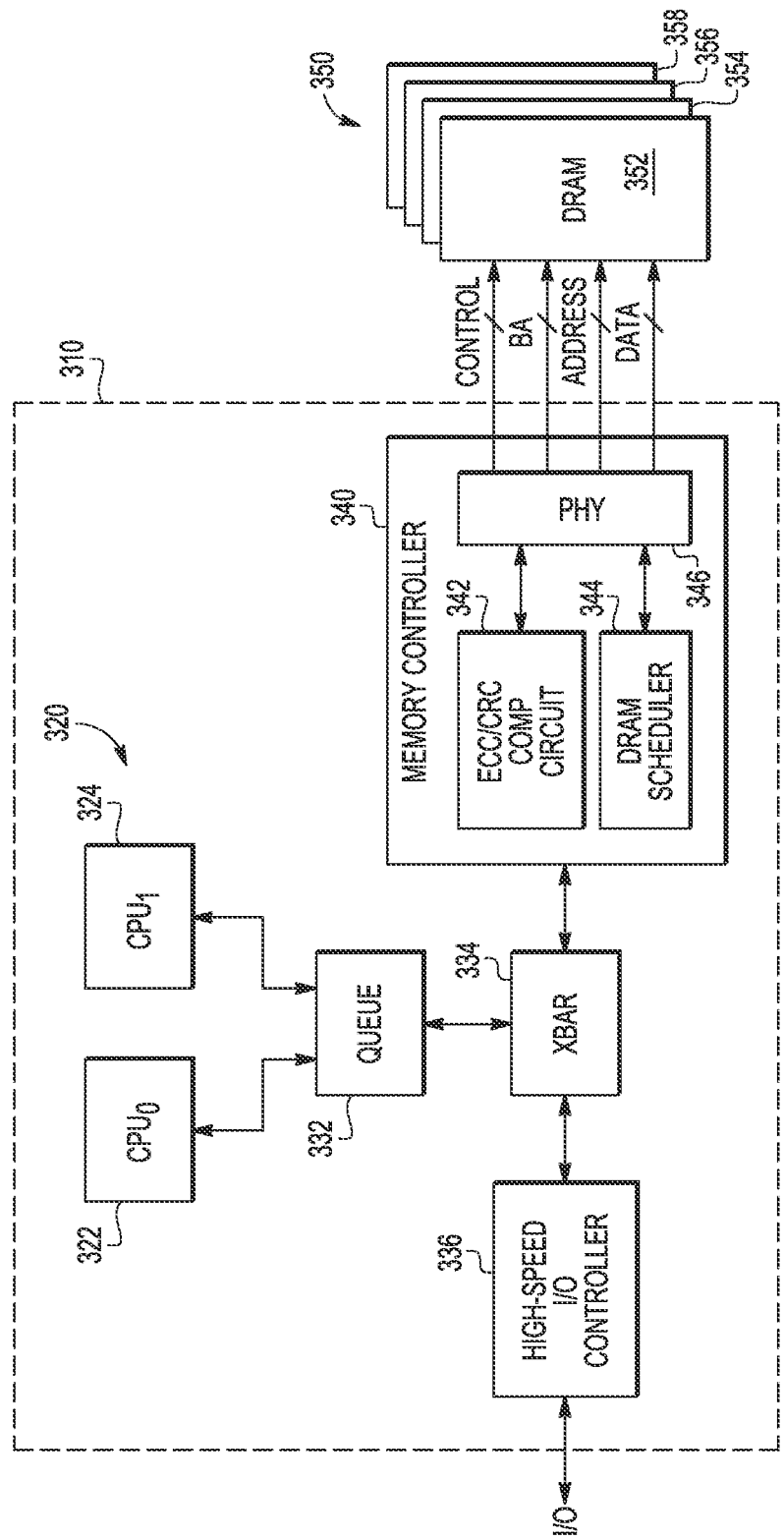
FIG. 3 illustrates in block diagram form an integrated circuit with a high reliability memory controller according to some embodiments.

FIG. 3 illustrates in block diagram form an integrated circuit 300 with a high reliability memory controller according to some embodiments. Integrated circuit 300 generally includes a multi-core processor 310 implemented on a single integrated circuit die and a memory 350.

Multi-core processor 310 includes a memory access generating circuit 320, a queue 332, a crossbar switch (XBAR) 334, a high-speed input/output (I/O) controller 336, and a memory controller 340. Memory access generating circuit 320 includes a central processing unit (CPU) core 322 labeled "$CPU_0$", and a CPU core 324 labeled "$CPU_1$". CPU cores 322 and 324 perform memory accesses and transmit and receive addresses, data, and control signals defining the memory accesses. Queue 332 is connected to CPU core 322, CPU core 324, and XBAR 334. XBAR 334 is connected to high-speed I/O controller 336 and memory controller 340. High-speed I/O controller 336 has an input/output (I/O) port to transmit and receive a set of external signals to a peripheral device, not shown in FIG. 3, labeled "I/O".

Memory controller 340 includes an error correction code (ECC)/cyclic redundancy code (CRC) computation ("comp") circuit 342, a dynamic random-access memory (DRAM) scheduler 344, and a physical interface (PHY) 346. ECC/CRC comp circuit 342 and DRAM scheduler 344 are each connected to PHY 346. PHY 346 has an output to provide a set of signals labeled "CONTROL", an output to provide a set of bank address signals labeled "BA", an output to provide a set of signals labeled "ADDRESS", and an I/O port to transmit and receive a set of signals labeled "DATA".

Memory 350 defines an address space and includes a multiple number of dynamic random access memory (DRAM) chips, including a DRAM 352, a DRAM 354, a DRAM 356, and a DRAM 358. Memory 350 may be implemented by either memory chip stack 140 of FIG. 1 or memory chip stack 240 of FIG. 2. DRAMs 352, 354, 356, and 358 are compatible with the DDR3 double data rate (DDR) standard published by JEDEC, but in other embodiments they could be compatible with other DDR and non-DDR standards. In general, DDR chips each have a set of memory banks Each DRAM chip in memory 350 has an input to receive CONTROL, an input to receive BA, an input to receive ADDRESS, and an I/O port to transmit and receive DATA.

In operation, CPU core 322 and CPU core 324 both have the capability to fetch and execute instructions corresponding to one or more programs and access data associated with the instructions by providing memory access requests to queue 332. Queue 332 stores accesses for dispatch to I/O controller 336 or memory controller 340. Queue 332 prioritizes data accesses on a first-in, first-out basis.

XBAR 334 switches and multiplexes the circuits of multi-core processor 310 and their associated busses, including memory access generating circuit 320, queue 332, high-speed I/O controller 336, and memory controller 340. High-speed I/O controller 336 provides a connection between XBAR 334 and external circuits, such as an Ethernet controller.

Memory controller 340 accesses memory locations in the address space of memory 350 in response to memory access requests. Memory controller 340 ensures high reliability by storing both normal data and special reliability information about the data in standard, off-the-shelf memory chips. The reliability data information allows the detection and possible correction of bit errors. By storing reliability data in low-cost commodity memory, memory controller 340 allows multi-core processor 310 to be integrated with stacked die in inexpensive multi-chip modules.

As will be described in more detail below, memory controller 340 accesses data elements in a first portion of the address space and reliability data corresponding to the data elements in a second portion of the address space. Memory controller 340 uses ECC/CRC comp circuit 342 to generate reliability data that it stores in memory 350, and later to calculate reliability data to check against stored reliability data. ECC/CRC comp circuit 342 checks data accessed by DRAM scheduler 324, using the reliability data, and if appropriate, selectively corrects errors in the data and forwards the corrected data to the requesting CPU.

PHY 346 provides an interface for ECC/CRC comp circuit 342 and DRAM scheduler 344 to multi-bank memory 350. To access data, PHY 346 provides standard CONTROL signals, BA signals, and ADDRESS signals to memory 350. In general, memory controller 340 responds to a read access request to control PHY 346 to read a data element from the first portion of the address space and the reliability data from the second portion of the address space. ECC/CRC comp circuit 342 generates reliability based on the received data and memory controller 340 compares the generated reliability data to the retrieved reliability data to determine whether the data was read correctly. Memory controller 340 responds to a write access request to control ECC/CRC comp circuit 342 to generate reliability data for a data element and controls PHY 346 to write the data element in the first portion of the address space and the reliability data in the second portion of the address space. The ways in which memory controller 340 creates and manages the address space of memory 350 for different levels of reliability support will now be described.

FIG. 4 illustrates a representation of an address space 400 for the memory of FIG. 3 according to some embodiments. Address space 400 generally includes a contiguous portion of addresses among consecutive memory banks including a memory bank 410 labeled "Bank 0", a memory bank 420 labeled "Bank 1", a memory bank 430 labeled "Bank 2", and memory bank 440 labeled "Bank 3".

Memory bank 410 includes a multiple number of 4 Kilobyte (KB) memory pages, including a representative memory page 412 labeled "A" and a multiple number of additional exemplary memory pages consecutively labeled "B" through "P".

Memory banks 420, 430, and 440 likewise include multiple numbers of 4 KB memory pages. Memory bank 440 however includes a contiguous data portion 442 and a contiguous reliability portion 444 for storing reliability data for all the memory banks Reliability portion 444 includes a representative memory page 446 labeled "E0", and a representative memory page labeled "E1". Memory page 446 includes reliability data, consecutively labeled "$E_A$" through "$E_H$", corresponding to data elements in memory pages A through H.

In operation, memory controller 340 accesses data elements in a first (e.g. top or lower address) portion of address space 400 and accesses reliability data corresponding to the data elements in a second (e.g. bottom or higher address) portion of address space 400, namely reliability portion 444. For example memory bank 410 is organized into 4 KB memory pages. FIG. 4 illustrates representative pages A through H in a contiguous portion of addresses. In memory bank 440, memory controller 340 also accesses one 4 KB memory page 446 for reliability data group E0, including reliability data $E_A$ through $E_H$, corresponding to data groups in pages A through H, in a contiguous portion of addresses 444.

Likewise, in memory bank 410, memory controller 340 accesses eight 4 KB memory pages for data groups in pages I through P in a contiguous portion of addresses. In memory bank 440, memory controller 340 also accesses one 4 KB memory page for reliability data group E1, including reliability data (not specifically shown in FIG. 4) corresponding to data groups in pages I through P, in reliability portion 444.

Address space 400 provides a linear data address space by placing reliability data in a contiguous portion at the end of address space 400, thereby avoiding "holes" in the address space. Address space 400 supports a variety of types of reliability data. For example, certain standards define a useful single error correction, double error detection (SECDED) code, such as the (72, 64) SECDED code, as having 8 reliability bits for every 64 data bits (72 total bits). Using SECDED, ECC/CRC comp circuit 342 has the capability to detect and to correct a single error, and to detect but not to correct a double error. For other known codes, ECC/CRC comp circuit 342 has the capability to detect and/or correct more than two errors. Address space 400 allows the size of reliability portion 444 to be varied based on the type of reliability code used, which itself can be based on the reliability needs of the system.

By placing all reliability data in a single memory bank, however, memory controller 340 could unacceptably increase access latency for some systems. For example in systems which simultaneously keep pages open in multiple banks, accesses to reliability portion 444 cause a "bottleneck" when memory controller 340 accesses the reliability data for accesses to different banks from a single bank 440. Note that multi-core processor 310 could incorporate other mechanisms to compensate for this bottleneck. For example, circuits such as memory controller 340 or memory access generating circuit 320 could prefetch the reliability data and store it in a local cache. Also as will be described more fully below, memory controller 340 could compensate for latency to access the reliability data by distributing the reliability data in more than one single bank, or store the data elements and the reliability data among the memory banks in an alternate form.

FIG. 5 illustrates another representation of an address space 500 for the memory of FIG. 3 according to some embodiments. Address space 500 generally includes a contiguous portion of addresses among consecutive memory banks, including a memory bank 510 labeled "Bank 0", a memory bank 520 labeled "Bank 1", a memory bank 530 labeled "Bank 2", and memory bank 540 labeled "Bank 3".

Memory bank 510 includes a multiple number of memory pages in a contiguous data portion 512, including four representative memory pages 516 consecutively labeled "A" through "D". Bank 510 also includes memory pages in a reliability portion 514. Each page in reliability portion 514 includes reliability data, including representative reliability data 518 labeled "$E_A$", and reliability data consecutively labeled "$E_B$" through "$E_D$", corresponding to data elements in memory pages A through D. Likewise, memory banks 520, 530, and 540 also include data portions 522, 532, and 543 and reliability portions 524, 534, and 544, respectively. Each page in reliability portion 524, 534, and 544 includes reliability data corresponding to data elements in data portions 522, 532, and 542, respectively.

In operation, memory controller 340 accesses data elements in a first portion of each memory bank and reliability data corresponding to the data elements in a second portion of the same memory bank. For example, memory controller 340 accesses data elements A, B, C, and D in memory pages 516 of data portion 510, and reliability data $E_A$ through $E_D$ in memory page 518 of reliability portion 514. Thus, memory controller 340 stores both the data and its corresponding reliability data in a single memory bank. Likewise, memory controller 340 accesses memory banks 520, 530, and 540, respectively for data elements in data portions 522, 532, and 542, respectively. Memory controller 340 also accesses memory banks 520, 530, and 540, respectively for reliability data in reliability portions 524, 534, and 544, respectively.

Overall, address space 500 has a non-contiguous data portion distributed among memory banks 510-540, and a non-contiguous reliability portion also distributed among memory banks 510-540. Memory controller 340 accesses data elements from the first (100-X) % of a memory bank and accesses reliability data from the last X % of the same memory bank. For example when memory controller 340 uses the (64, 72) SECDED code, X=12.5%. While address space 500 does not include a single, linear data space, by placing reliability data in the same memory bank as the corresponding data, memory space 500 avoids the bottlenecks associated with memory space 400 of FIG. 4.

Figure 6:
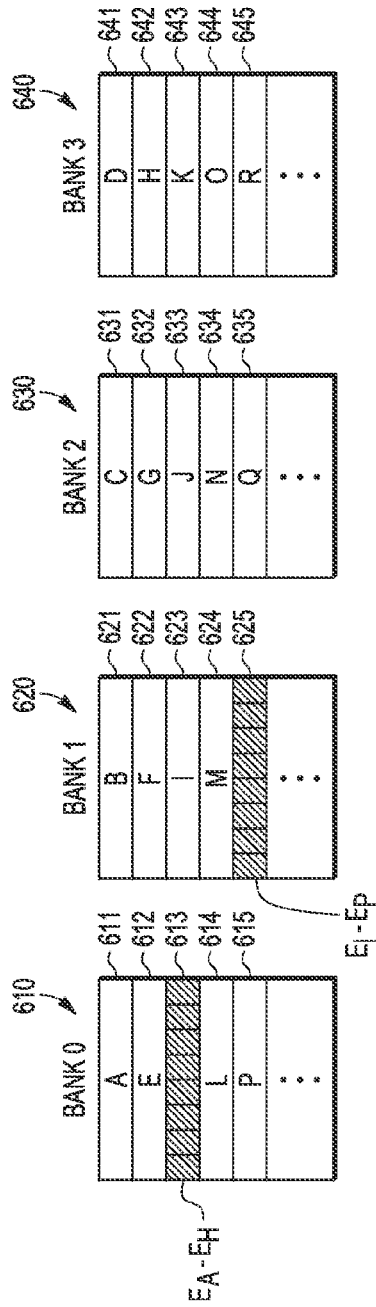
FIG. 6 illustrates another representation of an address space for the memory of FIG. 3 according to some embodiments.

FIG. 6 illustrates another representation of an address space 600 for the memory of FIG. 3 according to some embodiments. Address space 600 generally includes a contiguous portion of addresses among consecutive memory banks, including a memory bank 610 labeled "Bank 0", a memory bank 620 labeled "Bank 1", a memory bank 630 labeled "Bank 2", and memory bank 640 labeled "Bank 3".

Address space 600 includes a multiple number of memory rows storing data and distributed among the four memory banks, including representative memory rows labeled "A" through "R". Address space 600 also includes a multiple number of memory rows storing reliability codes for the data and also distributed among the memory banks, and interleaved with rows having data elements. Each of these rows has reliability data corresponding to data elements of other rows.

In particular, memory bank 610 includes rows 611-615; memory bank 620 includes rows 621-625; memory bank 630 includes rows 631-635; and memory bank 640 includes rows 641-645. In address space 600, data is distributed among the memory banks. Thus data element A is stored in row 611 of bank 610, data element B is stored in row 621 of bank 620, and so on until data element H is stored in row 642 of bank 640. However after eight data elements distributed in rows in this fashion, a set of reliability data corresponding to the rows is stored. Thus memory bank 610 includes reliability data labeled "$E_A$-$E_H$" in row 613 corresponding to the data elements in the rows A through H.

Banks 610-640 store eight subsequent data elements I through P in consecutive locations starting with row 623 in bank 620 storing data element I, row 633 in bank 630 storing data element J, and so on until row 615 in bank 610 stores data element P. Row 625 of memory bank 620 stores reliability data labeled "E$_I$-E$_P$" corresponding to the data elements in the rows I through P, and so on.

In operation, memory controller 340 interleaves data elements with reliability data corresponding to the data elements among consecutive memory banks 610 through 640 in address space 600. Memory controller 340 stores each data element of a data group, having a certain number of consecutively addressed data elements among consecutive banks of a multiple number of banks, and stores reliability data for all data elements of the group in a next consecutive bank. For example, memory controller 340 accesses the first eight data groups horizontally in rows 611, 621, 631, 641, 612, 622, 632, and 642, among memory banks 610 through 640. Memory controller 340 accesses reliability data E$_A$-E$_H$ located in row 613 following the eighth data group, which stores reliability data corresponding to the first eight data groups in rows A-H. Memory controller 340 also accesses the second eight data groups horizontally in rows 623, 633, 643, 614, 624, 634, 644, and 615, among memory banks 610 through 640. Memory controller 340 also accesses reliability data E$_I$-E$_P$ in row 625 following the second eight data groups, which stores reliability data corresponding to the second eight data groups in rows I-P, and so on.

By interleaving data elements with reliability data corresponding to the data elements among consecutive memory banks, memory controller 340 reduces the chance that reliability data for a particular memory access will be stored in the same memory bank that stores the data. In a DDR DRAM, prior to accessing a new page the previous page must be closed by issuing a precharge command to the bank, and the new page opened by issuing an activate command. Thus by reducing the probability that data and its corresponding reliability data will be stored in the same bank, address space 600 reduces the average amount of time required to access data and corresponding reliability data.

Figure 7:
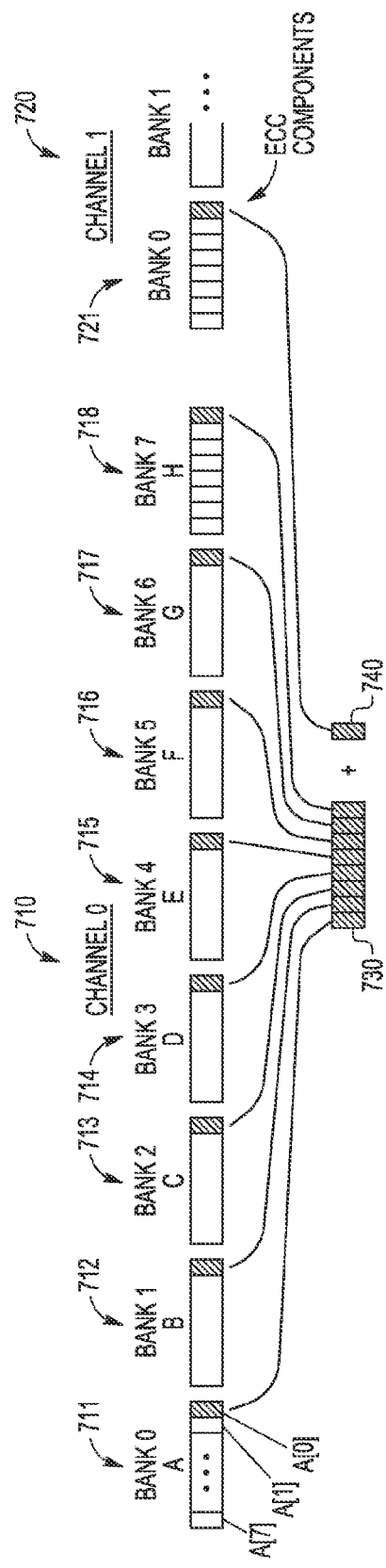
FIG. 7 illustrates another representation of an address space for the memory of FIG. 3 according to some embodiments.

FIG. 7 illustrates another representation of an address space 700 for the memory of FIG. 3 according to some embodiments. Address space 700 generally includes a memory channel 710 labeled "Channel 0", a memory channel 720 labeled "Channel 1", a data element 730, and reliability data 740. Memory channel 710 includes a multiple number of memory banks, including memory banks 711 through 718, consecutively labeled "Bank 0" through "Bank 7".

Memory bank 711 includes a data group labeled "A" including data bytes "A [7]" through "A [0]" respectively. Memory banks 712-718 likewise include data groups each having eight bytes and arranged in a similar fashion as memory bank 711. Memory bank 712 includes a data group labeled "B" including data bytes "B [7]" through "B [0]" respectively. Memory bank 713 includes a data group labeled "C" including data bytes "C [7]" through "C [0]" respectively. Memory bank 714 includes a data group labeled "D" including data bytes "D [7]" through "D [0]" respectively. Memory bank 715 includes a data group labeled "E" including data bytes "E [7]" through "E [0]" respectively. Memory bank 716 includes a data group labeled "F" including data bytes "F [7]" through "F [0]" respectively. Memory bank 717 includes a data group labeled "G" including data bytes "G [7]" through "G [0]" respectively. Memory bank 718 includes a data group labeled "H" including data bytes "H [7]" through "H [0]" respectively.

Memory channel 720 includes a multiple number of further memory banks, including a representative memory bank 721 labeled "Bank 0" and a representative memory bank labeled "Bank 1". Memory bank 721 includes reliability data components labeled "ECC components".

Data element 730 includes eight representative data bytes, component [0] through component [7].

In operation, memory controller 340 interleaves portions of data element 730 among memory channel 710, and stores reliability data for data element 730 in further memory bank 721. For example, memory controller 340 stores component [0] of data element 730 in A [0] of bank 711, component [1] of data element 730 in B [0] of bank 712, component [2] of data element 730 in C [0] of bank 713, and so on, through component [7] of data element 730 in H [0] of bank 718. Memory controller 340 further stores reliability data component 740, corresponding to data component [7] through data component [0], in byte position [0] of further memory bank 721.

By interleaving the bytes of a data element among the banks of a memory channel, and storing the reliability data bytes in a further bank of a further memory channel, memory controller 340 allows recovery of data when a single bank fails.

However, memory controller 340 has the capability to recreate the data components of a failing memory bank, in other fully functional memory banks. For example, since memory controller 340 stores each component of a data element in a memory bank, and covers each component with a reliability data component from a further memory bank, every data element component of a failing memory bank is covered by associated reliability data from a further bank. Using, for example, a SECDED code, memory controller 340 has the capability to detect, correct, and recreate all data elements in a failing bank.

By using configurations such as the ones disclosed in FIGS. 4-7 above, multi-core processor 310 enhances the reliability, availability, and serviceability of the system without adding memory chips using inexpensive, off-the-shelf memory.

Figure 8:
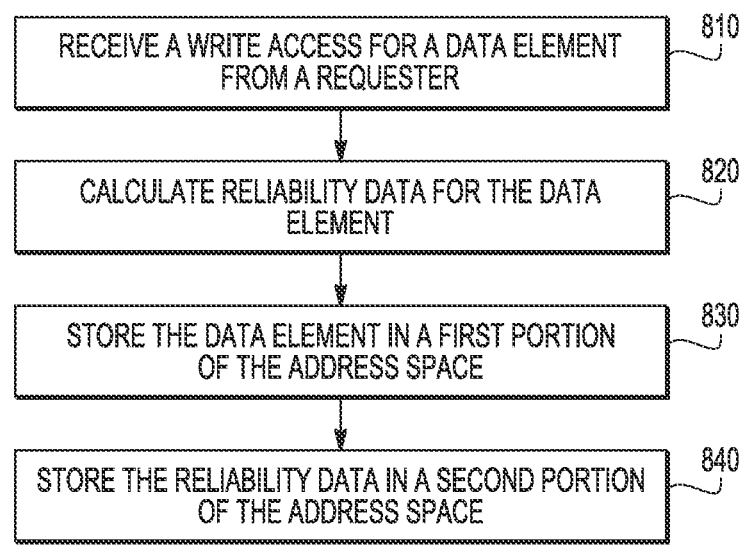
FIG. 8 illustrates a flow diagram of a method of writing data according to some embodiments.

FIG. 8 illustrates a flow diagram of a method 800 of writing data according to some embodiments. At an action box 810, a write access for a data element is received from a requester. At an action box 820, reliability data for the data element is calculated. At an action box 830, the data element is stored in a first portion of an address space. At action box 840, the reliability data is stored in a second portion of said address space.

Figure 9:
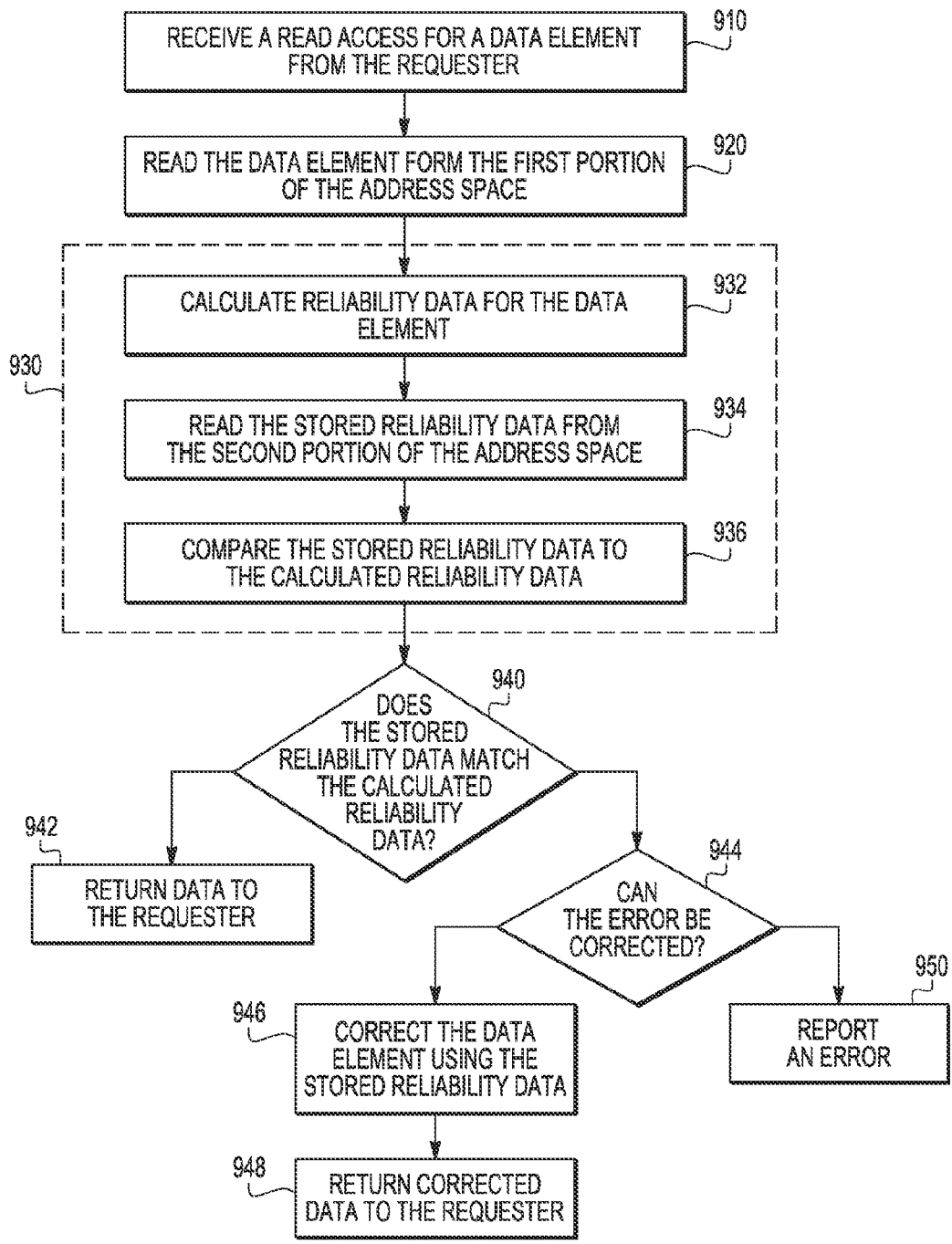
FIG. 9 illustrates a flow diagram of a method of reading data according to some embodiments.

FIG. 9 illustrates a flow diagram of a method 900 of reading data according to some embodiments. For example, the reading could be done for data that was previously written using method 800 of FIG. 8. At an action box 910, a read access for the data element is received from the requester. At a decision box 920, the data element is read from the first portion of the address space. At a set of action boxes 930, whether the reliability data was correctly read is determined.

Set of action boxes 930 further includes an action box 932 in which reliability data for the data element read from the first portion of the address space is calculated to form calculated reliability data, an action box 934 in which the reliability data stored in the second portion of the address space is read to form stored reliability data, and an action box 936 in which the calculated reliability data is compared to the stored reliability data.

Continuing with method 900, a decision box 940 determines whether the stored reliability data matches the calculated reliability data. If the stored reliability data matches the calculated reliability data, the flow proceeds to an action box 942, which returns the data element to the requester. If the stored reliability does not match the calculated reliability data, then flow proceeds to a decision box 944 which determines whether the reliability data can be corrected. If the reliability data can be corrected, then the flow proceeds to an action box 946 which corrects the data, and an action box 948 which returns corrected data to the requester. If the reliability data cannot be corrected, flow proceeds to an action box 950 which reports an error to the requester.

Storing and later retrieving the data and the corresponding reliability data can be performed using any of the techniques described in FIGS. 4-7 above. Thus in some embodiments, the address space is divided into a first contiguous portion of addresses and a second contiguous portion of addresses, the data element is stored in the first contiguous portion of addresses, and the reliability data is stored in the second contiguous portion of addresses. In some embodiments, the address space is divided into a first contiguous portion of addresses of a bank and a second contiguous portion of addresses of the bank, the data element is stored in the first contiguous portion of addresses of the bank and the reliability data is stored in the second contiguous portion of addresses of the bank. In some embodiments, the address space is divided among a plurality of banks having an order within the address space, the first portion of the address space is formed as a plurality of groups of a predetermined number of data elements distributed among the plurality of banks in the order, and the second portion of the address space comprises a reliability data element for each corresponding data element of each of the plurality of groups, wherein reliability data elements for a group are located in a first bank following a second bank that includes a last data element of the group in the order. In some embodiments, the address space is formed using a first channel and a second channel, the first channel comprising a plurality of banks, the data element is distributed among the plurality of banks in the first channel, and the reliability data for the data element is stored in the second channel.

Memory controller 340 of FIG. 3 may be implemented with various combinations of hardware and software, and the software component may be stored in a computer readable storage medium for execution by at least one processor. Moreover the address maps illustrated in FIGS. 4-7 may also be implemented at least in part by instructions that are stored in a computer readable storage medium and that are executed by at least one processor implementing the function of memory controller 340. Each of the operations shown in FIGS. 8 and 9 may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Moreover, memory controller 340 and/or multi-core processor 310 may be described or represented by a computer accessible data structure in the form of a database or other data structure which can be read by a program and used, directly or indirectly, to fabricate integrated circuit 300. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising integrated circuit 300. The netlist may then be placed and routed to produce a data set describing geometric shapes to be applied to masks. The masks may then be used in various semiconductor fabrication steps to produce a integrated circuit 300. Alternatively, the database on the computer accessible storage medium may be the netlist (with or without the synthesis library) or the data set, as desired, or Graphic Data System (GDS) II data.

Various modifications to the disclosed embodiments will be apparent to those skilled in the art. The memory controller described herein is useful for other integrated circuit configurations that are susceptible to data corruption besides multi-chip modules 100 and 200. For example, the processor and memory chips are directly attached to a motherboard substrate using flip-chip bonding. The memory controller and memory could also be implemented on the same die but for other reasons be susceptible to data corruption, such as by being used in environments with high levels of electromagnetic interference (EMI). Memory chip stack 140 or memory chip stack 240 can be implemented separate from integrated circuit 300 main memory, e.g., as separate CPU memory, separate graphics processing unit (GPU) memory, separate APU memory, etc. Die stacking integration 100 and die stacking integration 200 can be implemented as a multi-chip module (MCM). Alternately, the memory chips can be placed adjacent to and co-planar with the CPU, GPU, APU, main memory, etc. on a common substrate. Note that while multi-chip modules 100 and 200 include 4-chip memory chip stacks, other embodiments could include different numbers of memory chips.

Memory controller 340 can be integrated with at least one processor core on a microprocessor die as shown in FIG. 3, or can be on its own separate chip. In some embodiments integrated circuit 310 can perform other overall functions besides computing functions, such as logic functions that do not require a CPU. Moreover while FIG. 3 shows memory controller 340 separate from CPU cores 322 and 324, it may also be formed inside the CPU core or other logic block.

The operation of memory controller 340 was described with respect to various address maps that implement different levels of reliability and overhead. FIGS. 4-7 illustrate these concepts with a representative number of memory banks but the techniques described therein can be scaled to different numbers of memory banks. For example if memory 350 is implemented with four DDR3 chips, then the total number of memory banks in the address space will be thirty two.

Examples of reliability data that may be used include parity bits, error correcting code bits {e.g., including but not limited to single error correction (SEC), single error correction and double error detection (SEC-DED), double bit error correction and triple bit error detection (DEC-TED), triple-error-correct, quad-error-detect (TEC-QED) and linear block codes such as Bose Chaudhuri Hocquenghem (BCH) codes} and checksums (for example, CRC, Message-Digest (MD5)). Support for one, two, or more levels of ECC protection can be provided, where the system hardware or software can make selections to balance performance and reliability.

Memory 350 has been described above in the context of DRAM technology. However, memory 350 can be implemented with other memory technologies, for example static random access memory (SRAM), phase-change memory (PCM), resistive RAM technologies such as memristors and spin-torque transfer magnetic RAM (STT-MRAM), and Flash memory.

The embodiments illustrated in FIGS. 4-7 above use one byte of reliability data per eight bytes of data. According to other embodiments, the amount of reliability data for a given number of data bytes can be different.

In the illustrated embodiments, memory controller 340 accesses reliability data in a certain portion of certain memory banks. According to some embodiments, memory controller 340 could access alternate portions of alternate memory banks.

Some illustrated embodiments show interleaving of data elements with reliability data corresponding to the data elements among a multiple number of banks. According to some embodiments, the interleaving and mapping algorithms could be modified.

In some embodiments, a contiguous portion of addresses across a multiple number of banks is shown. According to other embodiments, the portion of addresses could be a non-contiguous portion of addresses and could include address holes.

Accordingly, it is intended by the appended claims to cover all modifications of the disclosed embodiments that fall within the scope of the disclosed embodiments.

What is claimed is:

1. An integrated circuit, comprising:
    a memory having an address space; and
    a memory controller coupled to said memory for accessing said address space in response to received memory accesses, said memory controller further accessing a plurality of data elements in a first portion of said address space, and reliability data corresponding to said plurality of data elements in a second portion of said address space,
    wherein:
        said address space comprises a plurality of banks having an order within said address space;
        said first portion of said address space comprises a plurality of groups of a predetermined number of data elements distributed among said plurality of banks in said order; and
        said second portion of said address space comprises a reliability data element for each corresponding data element of each of said plurality of groups, wherein reliability data elements for a group are located in a first bank following a second bank that includes a last data element of said group in said order.

2. The integrated circuit of claim 1, further comprising:
    a memory access generating circuit for generating said memory accesses and providing said memory accesses to said memory controller.

3. The integrated circuit of claim 2, wherein:
    said memory access generating circuit comprises a central processing unit core.

4. The integrated circuit of claim 2, wherein:
    said memory access generating circuit and said memory controller are combined on a single integrated circuit die.

5. The integrated circuit of claim 1, wherein:
    said memory comprises a plurality of memory chips arranged in a memory chip stack.

6. The integrated circuit of claim 1, wherein:
    said reliability data comprises a plurality of error correcting codes (ECCs) including at least one ECC for each of said data elements.

7. The integrated circuit of claim 1, wherein:
    said reliability data comprises a plurality of cyclic redundancy check (CRC) codes including at least one CRC for each of said data elements.

8. A method, comprising:
    receiving a write access for a data element from a requester;
    calculating reliability data for the data element; and
    storing the data element in a first portion of an address space and the reliability data in a second portion of said address space,
    wherein said storing comprises:
        dividing the address space among a plurality of banks having an order within the address space;
        forming the first portion of the address space as a plurality of groups of a predetermined number of data elements distributed among the plurality of banks in the order; and
        forming the second portion of the address space comprises a reliability data element for each corresponding data element of each of the plurality of groups, wherein reliability data elements for a group are located in a first bank following a second bank that includes a last data element of the group in the order.

9. The method of claim 8 further comprising:
    receiving a read access for the data element from the requester;
    reading the data element from the first portion of the address space; and
    determining whether the reliability data was correctly read.

10. The method of claim 9 wherein the determining comprises:
    calculating reliability data for the data element read from the first portion of the address space to form calculated reliability data;
    reading the reliability data stored in the second portion of the address space to form stored reliability data; and
    comparing the calculated reliability data to the stored reliability data.

11. The method of claim 10 further comprising:
    when the stored reliability data matches the calculated reliability data, returning the data element to the requester; and
    when the stored reliability does not match the calculated reliability data, determining whether the reliability data can be corrected;
    when the reliability data can be corrected, correcting the data and returning corrected data to the requester; and
    when the reliability data cannot be corrected, reporting an error to the requester.

* * * * *

UNITED STATES PATENT AND TRADEMARK OFFICE
CERTIFICATE OF CORRECTION

| | |
|---|---|
| PATENT NO. | : 8,984,368 B2 |
| APPLICATION NO. | : 13/649745 |
| DATED | : March 17, 2015 |
| INVENTOR(S) | : Gabriel H. Loh et al. |

It is certified that error appears in the above-identified patent and that said Letters Patent is hereby corrected as shown below:

In the Specification:

In column 3, line 58, replace "banks" with "banks.".

In column 4, line 65, replace "banks" with "banks.".

Signed and Sealed this
Eighth Day of December, 2015

Michelle K. Lee
*Director of the United States Patent and Trademark Office*